K. E. PEILER.
GLASS DELIVERING APPARATUS.
APPLICATION FILED MAR. 27, 1917.

1,373,202.

Patented Mar. 29, 1921.

4 SHEETS—SHEET 3.

Witness:
S. S. Grotta

Inventor:
Karl E. Peiler
by W. H. Honiss
Atty.

K. E. PEILER.
GLASS DELIVERING APPARATUS.
APPLICATION FILED MAR. 27, 1917.
1,373,202.
Patented Mar. 29, 1921.
4 SHEETS—SHEET 4.
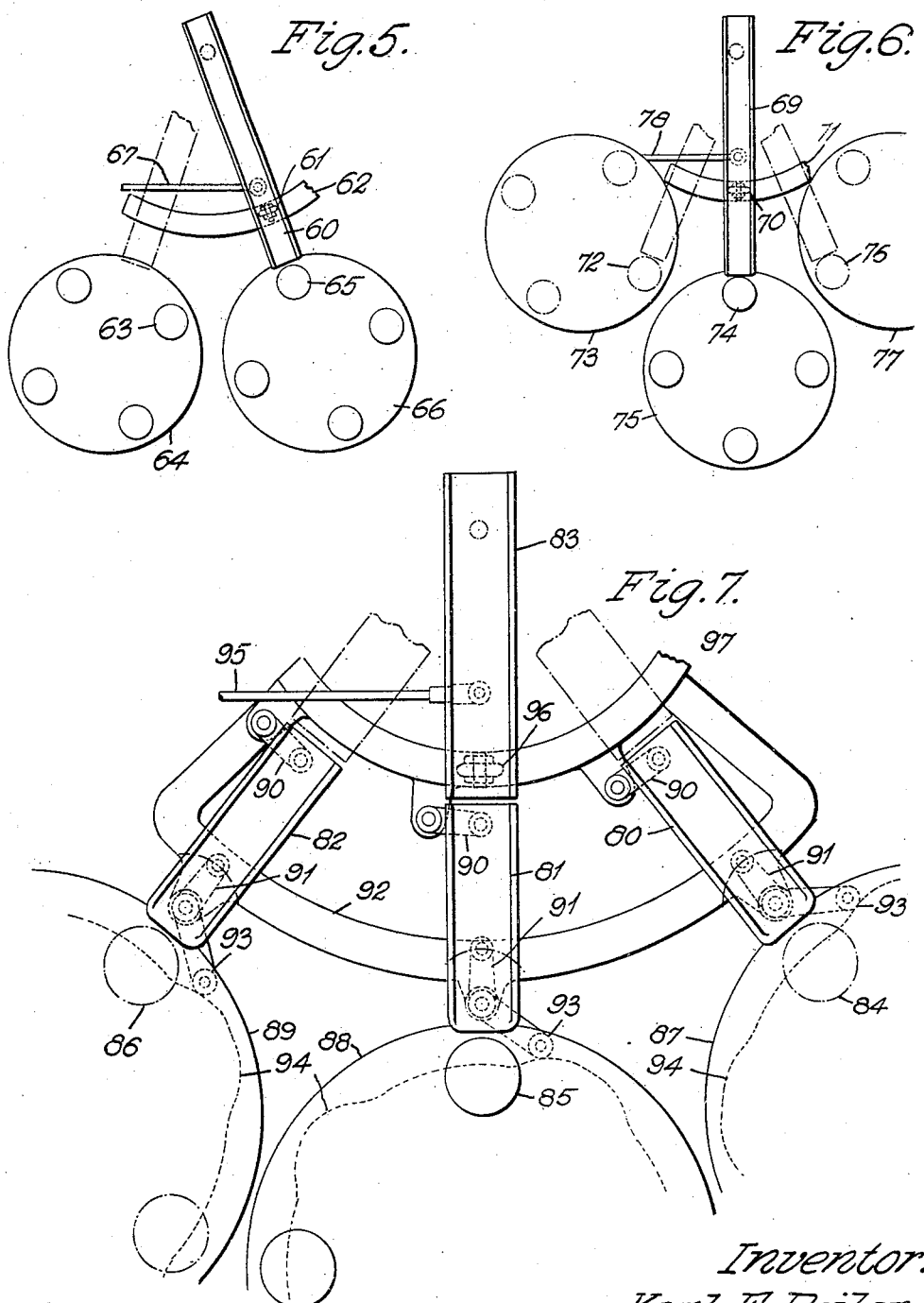
Witness:
S. S. Grotta
Inventor:
Karl E. Peiler
by Wm H Honiss
Atty.

UNITED STATES PATENT OFFICE.

KARL E. PEILER, OF HARTFORD, CONNECTICUT, ASSIGNOR TO HARTFORD-FAIRMONT COMPANY, OF CANAJOHARIE, NEW YORK, A CORPORATION OF NEW YORK.

GLASS-DELIVERING APPARATUS.

1,373,202.  Specification of Letters Patent.  Patented Mar. 29, 1921.

Application filed March 27, 1917. Serial No. 157,633.

*To all whom it may concern:*

Be it known that I, KARL E. PEILER, a citizen of the United States, residing at Hartford, in the county of Hartford and State of Connecticut, have invented new and useful Improvements in Glass-Delivering Apparatus, of which the following is a specification.

This invention relates to an apparatus which is designed to conduct and deliver gathers or charges of molten glass obtained by any suitable means from the outlet spout of a melting furnace or other container of molten glass to the molds or other apparatus of a machine for shaping the glass into articles of commerce.

In application Serial No. 15,875, filed by me on March 20, 1915, an apparatus is shown and described for conducting charges of glass from the discharge outlet of a melting furnace or other container of molten glass and delivering them successively to molds carried by the table of a single glass forming machine. The object of the present invention is to provide an apparatus which will conduct the charges or gathers of molten glass from the outlet spout of a melting furnace or other container of molten glass, and deliver the charges to molds carried by the tables of two or more glass forming machines, either while the molds are stationary, or while they are traveling, the conducting apparatus operating in conjunction with the several forming machines in such manner that the charges of glass are delivered in succession first to a mold on the table of one machine and then to a mold on the table of another machine. This enables a mold of one machine to be filled while the mold of another machine is being moved into filling position. Thus a single feeding machine may be utilized for feeding a plurality of shaping machines, greatly increasing the output of the machines without requiring an increase in labor or attendance.

Figure 1:
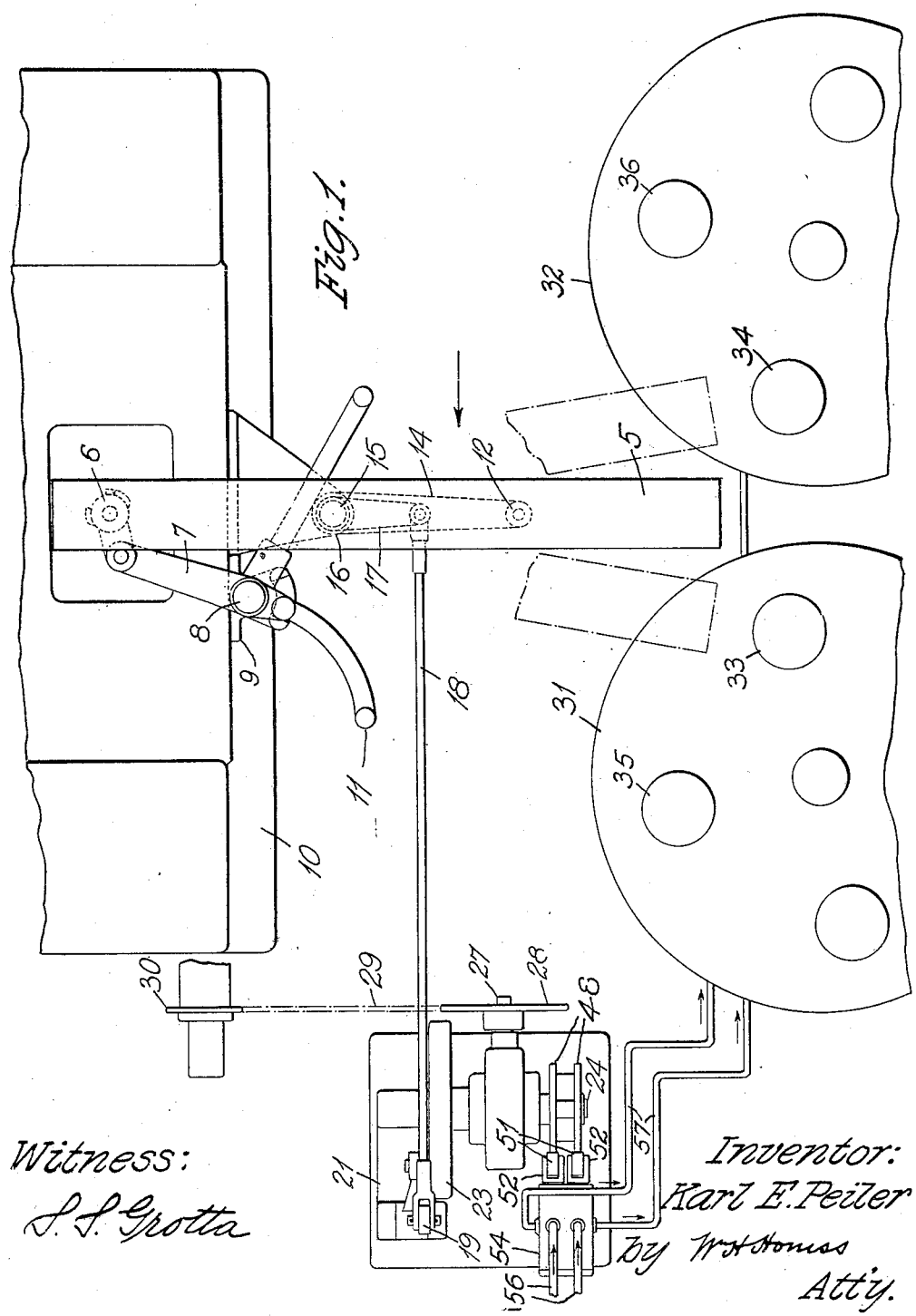
Figure 2:
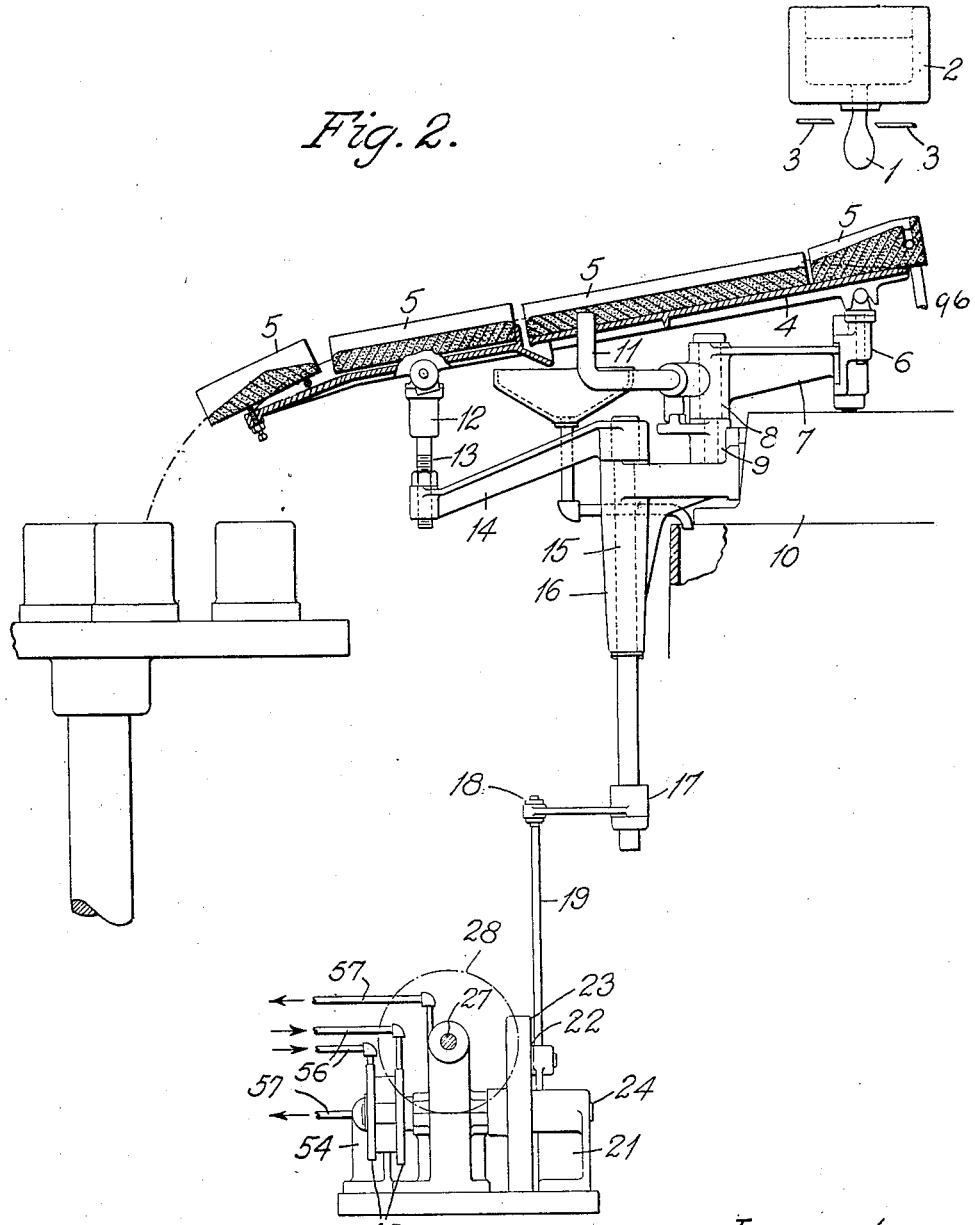
Figure 3:
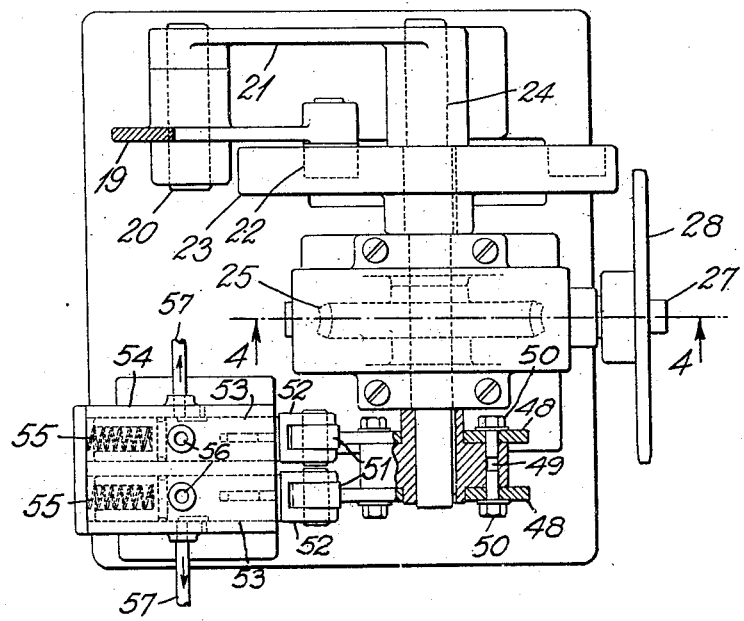
Figure 4:
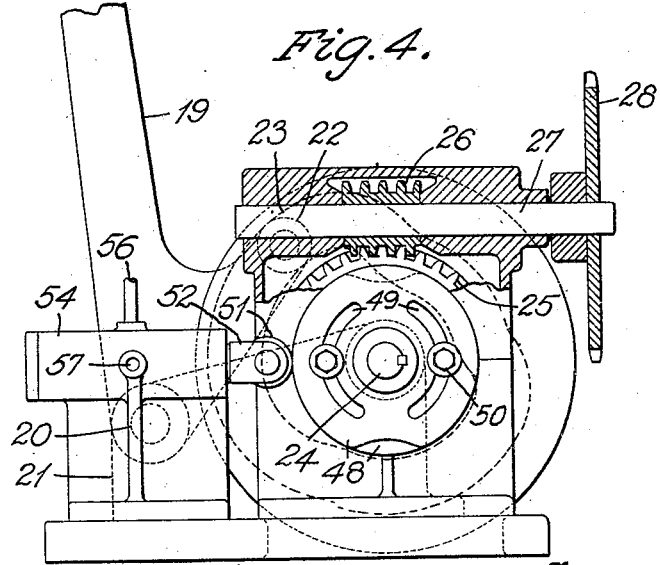

Of the accompanying drawings Figure 1 is a more or less diagrammatic plan view of a form of glass conducting apparatus which embodies the invention, arranged for delivering gathers or charges to the molds carried by the rotary tables of two forming machines. Fig. 2 shows a side elevation, with the conducting chute cut in longitudinal section, of the apparatus illustrated in Fig. 1, looking in the direction indicated by the arrow on that figure. Fig. 3 is a plan on larger scale of a form of mechanism shown in Fig. 2, for actuating the conducting apparatus and controlling the related movements of the operating tables of the forming machines, especially for cases where the tables are to be moved intermittently. Fig. 4 shows a side elevation of the driving mechanism with parts in section on plane indicated by the dotted line 4—4 on Fig. 3. Fig. 5 is a diagrammatic representation of a conducting chute arranged to deliver molten glass charges alternately to two rotary mold carrying tables. Fig. 6 is a similar view with the conducting apparatus illustrated as designed to deliver molten glass charges in succession to three rotary mold carrying tables. Fig. 7 represents a modified form of conducting apparatus arranged to deliver molten glass charges to three rotary mold carrying tables.

The molten glass gather or charge 1 fed from the discharge opening of the spout 2 of any common type of melting furnace or other glass container, and severed from the supply by shear blades 3 operated in any usual way, drops upon the upper end of and slides down the inclined conducting chute (Fig. 2). The chute shown is formed of a metal frame 4 which may be lined with sections 5 of heat resisting material. The upper end of the conducting chute is illustrated as mounted on a swivel block 6 that is carried by the end of a lever 7 which is fulcrumed on a stud 8 set in a bracket 9 attached to the bed 10 of the feeder. The lever 7 is provided with handles 11 which may be grasped for turning the lever and swinging the upper end of the chute from beneath the outlet from the feed spout when desired.

The lower end of the trough is mounted on a swivel block 12 that has a threaded stem 13 adjustably held in the outer end of a lever 14. This lever is secured to a shaft 15 supported in bearings in a bracket 16 which is attached to the feeder bed. Secured to the lower end of the shaft 15 is a rocker arm 17 which is connected by a rod 18 with the upper end of a lever 19, Fig. 1. The lever 19 is fulcrumed on an arbor 20 supported by a bracket 21 and carries a roll 22 that travels in a cam groove in the cam disk 23 on the shaft 24, Fig. 3. This shaft has a worm wheel 25 meshing with a worm 26 on a spindle 27 that is provided with a driving sprocket 28, Fig. 4. The drive sprocket may be connected by a drive chain 29 with a sprocket 30 driven by any suitable source of power, preferably from some part of the feeding machine, Fig. 1.

By means of this mechanism the lower end of the conductor chute is oscillated horizontally back and forth. The lower end of the conductor chute may be oscillated between two tables 31 and 32, as shown in Fig. 1, so as to deliver charges of glass first to a mold 33 on one table and then to a mold 34 on the other table, after which the chute swings back and will deliver a charge of glass to the next mold 35 which has been brought into proper position, and then to a mold 36 on the other table which in the meantime has been brought into proper position. The tables and the molds which they carry are indicated in diagram only as they are of common and well known construction and are driven by the usual means either continuously or intermittently. The cam 23 which causes the oscillation of the lower end of the conducting chute may be timed so that the end of the chute will dwell above a mold on the table while that mold is stationary, if the table is intermittently driven, or the cam may be timed to move the end of the chute with the mold for a short interval while the glass is delivering thereto in cases where the table travels continuously.

Mounted on the cam shaft 24 of the driving mechanism are cams 48, slots 49 and screws 50 being provided to enable these cams to be adjusted as may be necessary. Engaging the surfaces of these cams are rollers 51 mounted in the forked heads 52 of the plunger valves 53 which are inclosed in a casing 54. Springs 55 are arranged to thrust these plunger valves so as to hold the rollers against the cams, Figs. 3 and 4. Air under pressure may be admitted to the chambers containing these valves through the pipes 56, and when the plungers are in one position the air pressure is permitted to pass through the pipes 57 to any suitable pneumatic mechanism employed for starting or actuating the table rotating mechanism, various forms of which are well known. The driving mechanism is, of course, provided with cams, valves and air pipes equal in number to the number of tables with which the conducting apparatus is to operate in conjunction. The valve cams are so timed that the mold carrying tables will be actuated and the conductor chute swung back and forth at the proper intervals for the parts to act coöperatively, and for the conductor to deliver the charges of molten glass to the molds when they are properly positioned to receive the charges.

As shown in Fig. 5, the lower end of the chute may be provided with a roll 61 designed to run on a track 62 when the lower end of the chute swings from a mold 63 on one table 64 to a mold 65 on the other table 66, and that track may be adjusted vertically at either or both ends, to regulate the height of the delivering end of the chute to suit molds of differing heights. Suitable means, not shown, but which may be like the mechanism shown in Figs. 3 and 4, may be used to move the chute by the connecting rod 67. In Fig. 6 the chute 60 is represented traveling over a track 71 by means of roll 70, and is designed so as to feed glass charges to the molds of three different tables. In this case the operating cam may be formed so as to oscillate the chute through rod 78, which will deliver glass first to a mold 72 on table 73, then to a mold 74 on table 75, and then to a mold 76 on table 77, or any other desired order of succession.

If desired in order to obviate the necessity of swinging the lower end of the conductor chute a long distance, and also to lighten the weight of the swinging parts, short supplemental chutes 80, 81 and 82 may be arranged as shown in Fig. 7, to lead from the end of the main chute 83 to the delivery positions of the molds 84, 85 and 86 on the tables 87, 88 and 89, respectively. In this case, the lower end of the main chute 83 will simply have to travel from supplemental chute 80 to 81, thus successively feeding to mold 84 on table 87, mold 85 on table 88, and mold 86 on table 89. In this way the chute 83 may be shorter, and may have more time for and between its movements than would be the case if it reached all the way to the molds. With this arrangement, if the mold carrying tables are arranged to rotate continuously it is desirable to hinge the upper ends of the supplemental chutes on links 90, which permit the necessary endwise movements of the chutes, and mount the lower ends of the supplemental chutes on levers 91 which links and levers are pivotally supported by a frame 92. The levers 91 are provided with rolls 93 which are in contact with cams 94 mounted on the tables so that the lower ends of the supplemental chutes will be carried along with the successive molds as the tables turn, through distances sufficient to insure the proper delivery of the glass charges into the molds, returning them to register with the next molds. If the tables are intermittent in their movement, as in some types of machines, so that the molds dwell when the charges of glass are being delivered to them, the cams and levers for swinging the lower ends of the supplemental chutes are omitted. The main chute 83 is oscillated by means of the connecting rod 95, by mechanism which may be like that shown in Figs. 3 and 4.

With apparatus which embodies this invention, charges or gathers of molten glass from the outlet of a melting furnace or other container of molten glass may be quickly and accurately delivered to molds on any desired number of mold carrying tables as the molds are presented in position to receive the charges, and consequently the charges of glass may be delivered from the furnace in such quantities and with such rapidity that the output of the furnace and of the molding, pressing or blowing machines is greatly augmented, although but a single feeding and conducting apparatus is employed.

This invention enables the gathers of glass to be delivered at a considerable distance from the furnace, so the shaping machines may be grouped in convenient relation to each other, and well away from the heat of the furnace, which is very trying to the operators, and detrimental to the machinery.

The chutes may if found necesary or desirable be lubricated by the method shown, described and claimed in my Patent No. 1,199,108 of September 26, 1916, whereby the chutes may be lined with a lubricating film of fluid, upon and along which the molten glass slides freely and rapidly, and therefore accurately as to time of delivery. Because of this accuracy, any of the modifications here shown may be adapted to deliver the glass charges either to constantly or to intermittently revolving molds. A supply pipe for conducting such lubricating fluid to the chutes, or any of them, is shown at 96 in Fig. 2.

Any or all of the chutes shown and described herein may be mounted and operated as shown in Fig. 2, with adjustments at or near the delivering ends of the chutes, to enable them to be raised and lowered into proper delivering relation to molds of different heights, and may be mounted upon swiveling supports, as shown in Fig. 2, to enable such vertical adjustments to be made.

The arms 91 (Fig. 7) carry the delivering ends of the chutes in an arc closely approximating the arc of movement of the revolving molds, thus increasing the accuracy of the delivery. The swinging links 90 allow of the necessary endwise movement of the chutes. Any of the chutes may be thus mounted or moved.

In various ways, as shown and suggested in the accompanying drawings, and in the foregoing description, the delivery of charges of glass may be made to a plurality of sets of molds or other receiving receptacles during the intermissions in their movement, or while traveling constantly, or while some of the sets are traveling constantly and others are moved intermittently. For example, in the arrangement shown in Fig. 5, both of the tables may be revolved constantly, or both may be revolved intermittently. Or one table may be revolved constantly and the other table be revolved intermittently. In the arrangement shown in Fig. 6 all of the tables may be revolved intermittently, or the central table 75 may be revolved constantly while the side tables 73 and 77 are revolved intermittently. Similarly in Fig. 7, all the tables may be revolved alike, either constantly or intermittently, or some of them may be revolved constantly while others are revolved intermittently. Thus, by various arrangements herein shown or suggested, the delivery of glass may be made to molds under widely varying conditions, extending to all the conditions found in practice.

In cases where the molds are advanced continuously, as for example on a constantly rotating mold table, the tables may be geared directly to the sprocket 28 of the controlling mechanism shown in Figs. 3 and 4. The cams 23, or similar cams for operating the chutes, may be mounted on or driven directly by or with those tables, and the devices shown in Figs. 3 and 4 for controlling the intermittent operation of the tables may be discontinued or omitted. When the tables or some of them are rotated intermittently, their movements are controlled as above described, by means of the cams 48, through the pneumatic connections operated by the said cams. These cams being adjustable around their shaft 24, as shown, the time of advancing movement of the respective tables may be varied throughout a wide range, so as to cause them to operate in proper sequence and to follow each other in any desired way.

In its broader aspect, the present invention contemplates the provision of a movable chute by which suitably formed and shaped individual mold charges are transferred from a charge forming station, which may comprise the container having an outlet and severing means as illustrated and described, to a plurality of charging stations, each charging station being the charge receiving position of a molding machine or other ware forming apparatus.

The invention claimed is:—

1. The combination, with means for feeding molten glass, of a plurality of sets of receptacles for the glass, each set revolving in a separate closed path, a movable chute having an inclined glass sliding surface and mounted to swing on a substantially vertical axis located outside of said paths, and means for swinging the chute on said vertical axis to move the same conducting surface successively into delivering alinement to receptacles of the different sets.

2. The combination, with means for feeding molten glass, of a plurality of sets of receptacles, a movable chute having an inclined glass conducting surface, and automatic means actuated in predetermined order and time for moving the chute to bring the same inclined conducting surface successively into delivering alinement to the receptacles of the different sets.

3. Means for feeding molten glass, including in combination a plurality of sets of receptacles, a movable chute mounted on a substantially vertical axis and having an inclined glass conducting surface, and automatic means actuated in a predetermined order and time for swinging the chute upon its said vertical axis to bring the same inclined conducting surface successively into delivering alinement to the receptacles of the different sets.

4. Means for feeding molten glass, including in combination a plurality of sets of receptacles for receiving the glass, a movable chute having a glass conducting surface, automatic means actuated in a predetermined order and time for moving the chute to bring the same conducting surface successively into delivering alinement to the receptacles of the different sets, including means for supporting and guiding the delivering end of the chute.

5. The combination, with a plurality of sets of traveling receptacles for molten glass, of a movable glass conducting chute, and automatic means actuated in a predetermined order and time for moving the delivery end of the chute successively into delivering alinement with receptacles of the different sets, and maintaining said alinement with each successive receptacle while traveling.

6. The combination, with a plurality of sets of traveling receptacles for molten glass, of a glass conducting chute pivotally mounted near its receiving end, and automatic means actuated in a predetermined order and time for swinging the delivery end of the said chute to and maintaining it in delivering alinement with successive receptacles of the different sets while the receptacle to which the glass is being delivered is traveling.

7. The combination, with a plurality of sets of traveling receptacles for molten glass, of a chute pivotally mounted near its receiving end, and having a glass conveying surface on its upper side declining toward the said sets of receptacles, and automatic means actuated in a predetermined order and time for swinging the delivery end of the chute alternately from the path of one set of receptacles to the path of another set of receptacles, and maintaining it in delivering alinement with the respective receptacles while the latter are traveling.

8. The combination, with an outlet for molten glass, of a plurality of sets of traveling receptacles for the glass located a substantial distance horizontally away from the said outlet, a chute pivotally mounted near its receiving end, approximately below the outlet, and having a glass conveying surface on its upper side declining toward the paths of said sets of receptacles, and automatic means actuated in a predetermined order and time for swinging the delivery end of the chute successively from one set of receptacles to another, and moving the chute in delivering alinement with the moving receptacles.

9. The combination, with an outlet for molten glass, of a plurality of sets of receptacles for the glass, a chute pivotally supported near its receiving end upon a substantially vertical axis located approximately beneath said outlet, and automatic means actuated in a predetermined order and time for moving the delivery end of the chute successively from one set of receptacles to another and maintaining it in delivering alinement with said receptacles.

10. The combination, with a plurality of sets of moving receptacles for molten glass, of a movable conducting chute, and automatic means actuated in a predetermined order and time for shifting the delivery end of the chute from delivering alinement with a moving receptacle of one set to delivering alinement with a moving receptacle of another set.

11. The combination, with a plurality of receptacles for molten glass that are movable in different paths, of a movable conducting chute, automatic means actuated in a predetermined order and time for shifting the delivery end of the chute from delivering alinement with a receptacle moving in one path to delivering alinement with a receptacle moving in another path, and maintaining the said alinement while the said receptacles are moving.

12. The combination, with a plurality of traveling receptacles for molten glass that are movable in different paths, of a movable chute having a glass conducting surface, and automatic means actuated in a predetermined order and time for moving the delivery end of the chute to carry the same conducting surface alternately from delivering alinement with a receptacle that moves in one path to delivering alinement with a receptacle that moves in another path.

13. The combination, with the delivery outlet of a glass container, of rotatable tables, glass receiving receptacles mounted on said tables, a movable chute having a receiving portion located beneath said outlet, and a delivering portion adapted to move back and forth between the respective paths of the receptacles on the respective tables, and automatic means actuated in a predetermined order and time for maintaining the movable end of the chute in delivering alinement with a receptacle on one table and then with a moving receptacle on another table.

14. In combination with means for feeding molten glass, a plurality of movable chutes adapted to receive and deliver the glass from said feeding means, and means for oscillating each of said chutes laterally independently of each other.

15. A glass delivering apparatus comprising a main chute and a supplemental chute adapted to coöperate with each other, means for moving the main chute horizontally relative to the supplemental chute, and means for oscillating the supplemental chute relative to the main chute.

16. Means for feeding molten glass, including in combination a plurality of sets of receptacles for the glass, a movable main chute for conducting the glass, a plurality of supplemental chutes for receiving the glass and distributing it to the respective sets of receptacles, and means for moving the main chute successively into delivering relation to the respective supplemental chutes.

17. Means for feeding molten glass, including in combination an outlet for the glass, a movable main chute having a single glass conducting surface for receiving glass from the outlet, a plurality of sets of receptacles for the glass, a supplemental chute for each set of receptacles adapted to receive the glass from the main chute and distribute it to the receptacles of the individual sets, and means for moving the main chute into glass delivering relation to the supplemental chutes.

18. Means for feeding molten glass, including in combination an outlet for the glass, a movable main chute for receiving the glass from the outlet, a plurality of movable receptacles for the glass, a plurality of supplemental chutes for receiving the glass from the main chute, means for moving the main chute successively into delivering alinement to the respective supplemental chutes, and means for moving the supplemental chutes to deliver the glass to the respective receptacles while the latter are moving.

19. The combination, with a plurality of sets of traveling receptacles for molten glass, of a movable conducting chute having its delivery end adapted to be brought successively into delivering alinement with the different sets of traveling receptacles, and a control apparatus for moving the chute and controlling the movements of the different sets of receptacles in consonance.

20. The combination, with means for feeding molten glass, of a plurality of movable receptacles for the glass, a movable chute for conducting glass to the respective receptacles, means for moving the chute successively into delivering alinement to the respective receptacles, and means for controlling and varying the related movements of the chute and of the receptacles.

21. Means for feeding molten glass, including in combination a plurality of sets of movable receptacles for receiving the glass, a movable chute, means for moving the chute successively into delivering alinement to the different sets of receptacles, and means for controlling the respective movements of the chute and of the two sets of receptacles in consonance, including means for adjusting the controlling means to vary its controlling operations.

22. A glass delivering apparatus comprising a main chute mounted for swinging movement and a plurality of radially movable supplemental chutes adjacent to the path of movement thereof, automatic means for swinging the main chute in a predetermined order and time to present it periodically to each of the supplemental chutes and means for moving said supplemental chutes relative to the main chute.

23. In combination with means for feeding molten glass, a mold, apparatus for delivering glass from said feeding means to said mold, comprising a main chute and a radially movable supplemental chute, and means actuated in a predetermined order and time for moving said supplemental chute in respect to the main chute and to the mold.

24. In an apparatus for delivering mold charges of molten glass, the combination with a charge forming station of a plurality of charging stations, a chute having one end in receiving relation with the forming station, and means for moving the other end of the chute successively into delivering relation with the charging stations.

25. In an apparatus for delivering mold charges of molten glass, the combination of means for separating an individual mold charge from a mass of molten glass, a plurality of sets of charge receiving molds, a chute having one end in receiving relation with the charge forming means, and means for moving the other end of the chute successively into delivering relation with a mold of each set when in receiving position.

Signed at Hartford, Connecticut this 26th day of March, 1917.

KARL E. PEILER.